(12) United States Patent
Kundzich et al.

(10) Patent No.: US 8,924,355 B1
(45) Date of Patent: Dec. 30, 2014

(54) CHECKPOINT RESTART

(75) Inventors: Olga Kundzich, Toronto (CA); Tomasz Majkowski, Mississauga (CA); Michael G. Roche, Hamilton (CA)

(73) Assignee: EMC Corporation, Hopkinton, MA (US)

( * ) Notice: Subject to any disclaimer, the term of this patent is extended or adjusted under 35 U.S.C. 154(b) by 328 days.

(21) Appl. No.: 13/075,073

(22) Filed: Mar. 29, 2011

(51) Int. Cl.
*G06F 17/30* (2006.01)

(52) U.S. Cl.
USPC .......................................................... 707/647

(58) Field of Classification Search
CPC .............. G06F 9/30087; G06F 9/3834; G06F 12/0842; G06F 9/3851; G06F 11/1466
See application file for complete search history.

(56) References Cited

U.S. PATENT DOCUMENTS

| 6,704,885 B1 * | 3/2004 | Salas-Meza et al. ........... 714/6.3 |
| 8,285,869 B1 * | 10/2012 | Graetz .......................... 709/233 |
| 2004/0030739 A1 * | 2/2004 | Yousefi'zadeh .............. 709/201 |
| 2008/0307019 A1 * | 12/2008 | Weiss et al. .................... 707/204 |
| 2011/0082972 A1 * | 4/2011 | Cherkasova et al. .......... 711/111 |

* cited by examiner

*Primary Examiner* — Yuk Ting Choi

(74) *Attorney, Agent, or Firm* — Van Pelt, Yi & James LLP

(57) ABSTRACT

A method for restarting backup including receiving an indication of an interruption to a backup process, saving data backed up prior to the interruption as a partial save set, and upon restart of the backup process, saving subsequently backed data in one or more subsequent partial save sets linked to a first partial save set.

20 Claims, 13 Drawing Sheets

At Data Server
(Before an Interruption)

At Data Server (After Restart)

Backed Up Data
(Merged entries from more than one partial save sets)

CHECKPOINT RESTART

BACKGROUND OF THE INVENTION

In a typical backup process, data at a server is backed up at a storage node. However, if a backup is interrupted before the process is completed, then the data that has been saved at the storage node is discarded for being potentially corrupt or inconsistent. Sometimes, large amounts (e.g., giga bytes or tera bytes) of data are discarded. Also, the backup is typically restarted from the beginning, regardless of how close the previous backup process was to completion. Discarding the less than full set of backup data and restarting backup from the beginning can be inefficient. In addition, the short window of time that administrators usually reserve for a backup process does not typically permit for a re-running of the entire backup.

BRIEF DESCRIPTION OF THE DRAWINGS

Various embodiments of the invention are disclosed in the following detailed description and the accompanying drawings.

DETAILED DESCRIPTION

Figure 1A:
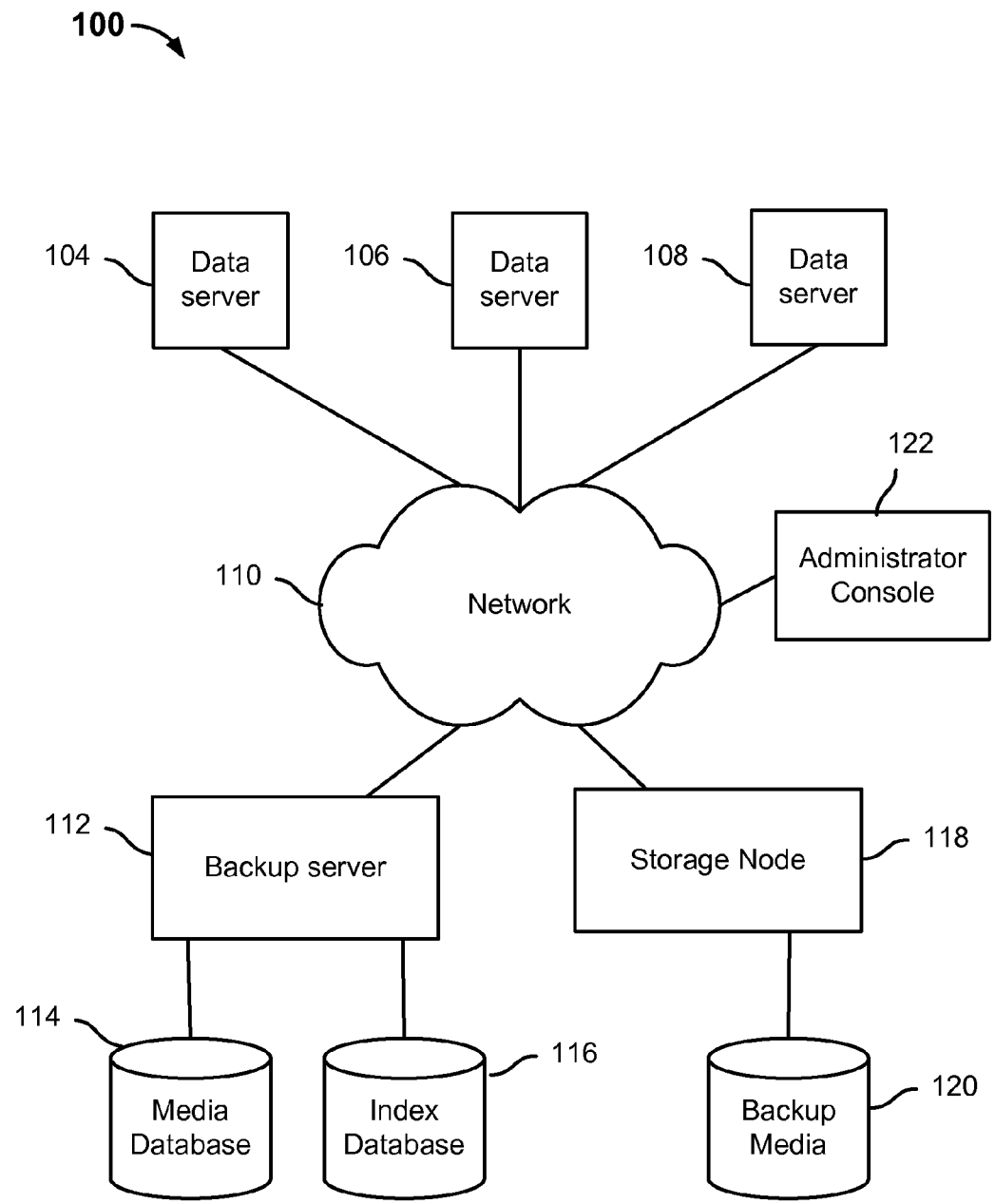
FIG. 1A is a diagram showing an embodiment of a system for restarting an interrupted backup process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Restarting an interrupted backup process from the point of failure is disclosed. In various embodiments, a set of source data to be backed up is selected. As used herein, a save set refers to a set of source data that is to be backed up. In various embodiments, after an interruption (e.g., a point of failure) of a backup process occurs, metadata is stored for the data that has already been successfully saved at a storage node prior to the interruption. As used herein, a partial save set refers to the set of data that has been successfully saved at the storage node between either the start or restart of a backup process and an interruption or completion of the backup. The backup process is restarted from the point of failure as part of a new partial save set. As used herein, a checkpoint refers to the last file that was successfully backed up prior to the interruption. In some embodiments, the point of failure is detected based on the stored metadata for the previous partial save set. In some embodiments, the backup is restarted from the determined checkpoint of the stored metadata. In some embodiments, the new partial save set is linked to the previous partial save set. If/when more interruptions occur before the backup process completes storing the entire save set, then the backup is restarted from each subsequent point of failure. Then, a partial save set and corresponding metadata can be created for the data that is successfully backed up before each point of failure or the completion of the backup process. In some embodiments, each partial save set can be cloned or staged. In some embodiments, a sequence of linked partial save set covers the all the data that was intended to be stored for a selected save set.

In some embodiments, data backed up using partial save sets can be recovered (e.g., copied back to a data server). In some embodiments, an entire sequence of partial save sets is recovered. In some embodiments, a specific file or directory among a sequence of partial save sets is recovered.

FIG. 1A is a diagram showing an embodiment of a system for restarting an interrupted backup process. System 100 includes data servers (104, 106, and 108), network 110, administrator console 122, backup server 112, media database 114, index database 116, storage node 118 and backup media 120. In various embodiments, network 110 includes various high speed data networks and/or telecommunications networks.

Data servers 104, 106 and 108 each includes a backup client application that communicates with backup server 112 and storage node 118 to perform backup of source data or recovery of data at data servers 104, 106 and 108. While data servers 104, 106 and 108 are shown in the example of FIG. 1, more or fewer data servers may be part of a system such as system 100. In some embodiments, a backup process is initiated at data servers 104, 106 and/or 108. In some embodiments, initiating a backup process includes selecting a save set (e.g., a set of files or source data at the server) to be backed up. In various embodiments, a backup process is restarted from the point of failure after an interruption occurs at the data server at which the backup process has originated.

In some embodiments, the backup client application at data servers 104, 106 and 108 is configured to sort the files (e.g., entries) in the filesystem before sending their corresponding data to backup server 112 and storage node 118 for backup. In some embodiments, the files are sorted alphabetically. The files are sorted so that the filesystem can be traversed in the same way each time (e.g., deterministic traversal). For example, if a point (e.g., checkpoint) on the filesystem is specified, then processing of the entries of the filesystem can be continued from that point (e.g., during a restart of a backup from a checkpoint) because the files before that point are considered to have been already traversed and processed.

Backup server 112 is configured to facilitate the process of backing up of source data or files from one or more of data servers 104, 106 and/or 108 at storage node 118. In some embodiments, backup server 112 is also configured to facilitate the recovery of backed up data (e.g., restoring backed up data to a server). In some embodiments, backup server 112 includes a backup and recovery software. An example of such software is the EMC® NetWorker®. In some embodiments, an administrator of the backup system can interact with the backup server software though a device such as administrator console 122. For example, the administrator can configure the parameters of the backup system via a user interface that is presented at the administrator console 122.

In various embodiments, backup server 112 is configured to create a partial save set after an interruption in the backup process has occurred. Examples of an interruption include, but are not limited to, a crash at a data server, a loss of power, a reboot, and a network failure. Subsequent to the interruption, backup server 112 creates a partial save set for the data that was successfully backed up at storage node 118. In various embodiments, creating a partial save set includes storing metadata at both media database 114 and index database 116 relating to the data (of the partial save set) that was successfully saved prior to the interruption. The validity information related to the data that was successfully saved in a partial save set is stored at media database 114. In some embodiments, the validity information includes a valid file count (e.g., total number of entire files that were stored on the backup media) and a valid data size (e.g., total size of all the entire files that were stored on the backup media). In some embodiments, media database 114 also includes information about save sets such as client name, save set name, and location (e.g., volume) in addition to validity information related to partial save sets. One or more index records related to each partial save set is stored at index database 116. In some embodiments, an index record includes the file names, file attributes, the directories to which a file belongs, save times and the locations in storage of the data that was saved in a partial save set. In various embodiments, an index record includes information related to only files that were successfully written to backup media 120 in a partial save set. A directory record is stored at index database 116 when all the files of the directory have been successfully saved to backup media 120. In some embodiments, index database 116 also includes information about files such as client names, file names, file attributes and save times in addition to index records and directory records. In various embodiments, a backup client application at data servers 104, 106 and/or 108 coordinates with storage node 118 to determine when data has been successfully written to backup media 120 before storing an index record. For example, files that were successfully written to backup media 120 are files that were written in their entirety to the backup media (as opposed to only being partially written). The index record(s) and validity information of a partial save set is used to prevent partial data (which could lead to data corruption) from being read or recovered. In various embodiments, the index records include the last successfully saved file (e.g., checkpoint), which is the last file that was successfully saved for the partial save set. In various embodiments, the backup process is restarted from the last successfully saved file of the previous partial save set. In some embodiments, to recover a file, the index database is first consulted for locating this file (e.g., and its corresponding save time) and then the file is found in the save set in the media database corresponding to this save time. Then the save set in the media database will point to the physical volume on which the save set is backed up.

In various embodiments, backup server 112 is configured to restart an interrupted backup process from the point of failure. In some embodiments, the restart occurs automatically either immediately or after a certain period subsequent to an interruption. In some embodiments, the restart is triggered by an administrator at one of the data servers (e.g., 104, 106, or 108) or at administrator console 122. In various embodiments, backup server 112 queries index database 116 and media database 114 for metadata related to the previous partial save set. A backup client application at data servers 104, 106 and/or 108 then determines the checkpoint (e.g., the last file that was successfully saved before the interruption in the previous partial save set) from the returned metadata. The backup client application at data servers 104, 106 and/or 108 is configured to create a new partial save set for the data to be backed up from the determined checkpoint. In various embodiments, the backup client application at data servers 104, 106 and/or 108 does not continue saving to the previous partial save set after restart. In various embodiments, the new partial save set is linked to the previous partial save sets based on attributes (e.g., the save or creation time of the first partial save set and a sequence number for the partial save set) stored at media database 114. The backup client application at data servers 104, 106 and/or 108 is configured to resume the backup process from the determined last successfully file (e.g., checkpoint) in the filesystem. Because the filesystem is sorted (e.g., either when the files were saved or during backup), the backup process can continue processing source files that have not yet been backed up in a previous partial save set by traversing and processing the source files subsequent to the determined checkpoint.

In various embodiments, backup server 112 and/or a backup client application at data servers 104, 106 and/or 108 is configured to recover data backed up on backup media 120. In some embodiments, an administrator may initiate a recovery process at data servers 104, 106, and/or 108 or administrator console 122. In some embodiments, backup server 112 (and/or a backup client application at data servers 104, 106 and/or 108) is configured to present a user interface with a list of save sets, receive a selection of one of the save sets and restore the entire selected save set using its associated partial save sets. In some embodiments, backup server 112 (and/or backup client application at data servers 104, 106 and/or 108) is configured to present a user interface with a directory structure displaying the backed up files or directories of a particular save set, receive a selection of a file or directory, and restore the selected file or directory.

Media database 114 is configured to store validity information regarding the partial save sets and save sets. In some embodiments, media database 114 is also configured to store, for example, which data servers were backed up in a particular backup process, attribute information (e.g., which sequence of partial saves sets is associated with the same save set), save times, and the actual data to be backed up in the format of the data on backup media 120. For example, attribute information can include the save time of the first partial save set in a sequence and also sequence numbers for all the partial save sets associated with the same sequence (e.g., all partial save sets in the same save set will include the save time of the first partial save set). In various embodiments, information at media database 114 is used to restart the save set and/or manage the partial save sets in the same sequence.

Index database 116 is configured to store information about files and directories. In some embodiments, index database 116 is configured to store index records for partial save sets. In some embodiments, index database 116 is also configured to store, for example, the attributes of all files that were backed up, file names (e.g., directory paths), save times, permissions, which files of a save set are in which partial save sets, which files belong to which directories and directory structures (e.g., in the form of linked lists) for entire directories that were successfully backed up. In some embodiments, such index records and directory records for a partial save set are stored with the identifying attribute information (e.g., to which sequence and where in that sequence it belongs) of that partial save set. This is to enable metadata for a specific partial save set to be easily identified. In various embodiments, without the ability to restart a backup from the point of failure (i.e., without a checkpoint enabled backup), index records were not stored for the interrupted save sets—the backup server would discard all the index records for a save set if client disconnected abruptly. However with the ability to restart a backup from the point of failure (i.e., with a checkpoint enabled backup), the index records for an interrupted save set are stored and not discarded.

Storage node 118 is configured to write the data from data servers 104, 106, and/or 108 to backup media 120. Backup media 120 includes disk or tape storage.

Figure 1B:
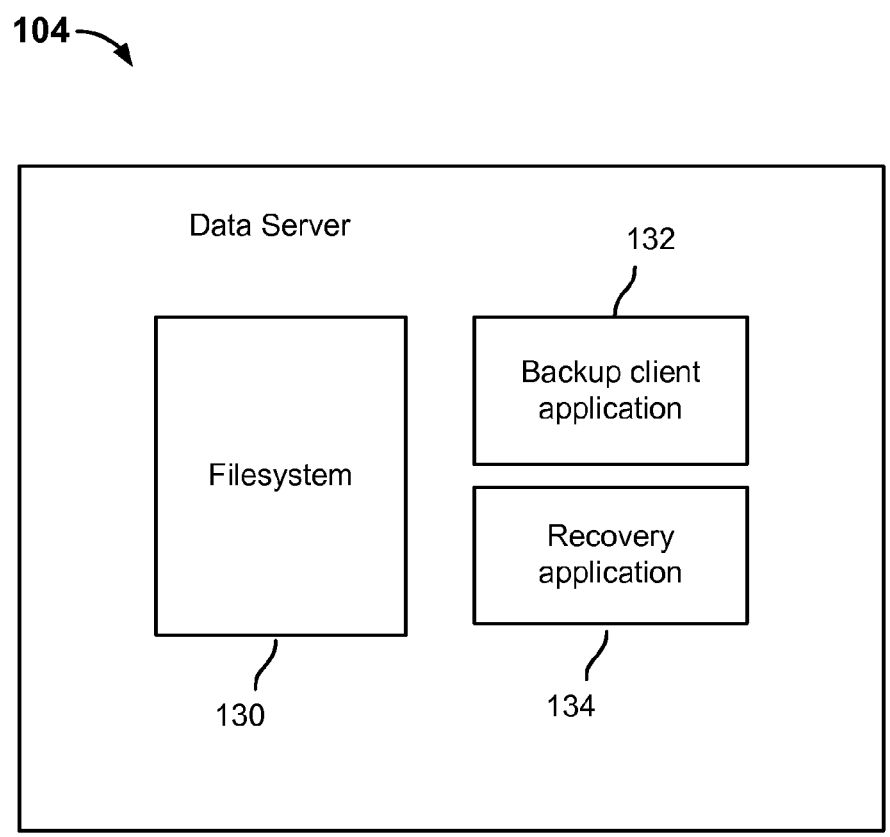
FIG. 1B is a diagram showing an embodiment of a data server.

FIG. 1B is a diagram showing an embodiment of a data server. In some embodiments, the example shown is an implementation of data server 104 of FIG. 1A. In some embodiments, the example shown can also be an implementation of one or both of data servers 106 and 108.

The data server shown in the FIG. 1B includes filesystem 130, backup client application 132 and recovery application 134. In various embodiments, filesystem 130 organizes the data objects stored (e.g., source data) stored at the data server. Filesystem 130 can include one or more directories into which the files stored at the data server are organized.

In various embodiments, a backup process is initiated at the data server (e.g., by an administrator of the data server). In some embodiments, a backup process is initiated either manually at the data server or by configuring a backup server to start a backup process periodically. For example, when a backup process is started by a backup server, the backup server can send requests to backup client applications at the data servers that specify which data to backup and how the backup is to be performed (e.g., whether it is a full or incremental backup, whether the backup should be restarted from a point of failure). In some embodiments, initiating a backup process includes using a user interface presented by backup client application 132 and/or an administrator console (not shown) to select a save set of files stored on the data server that are to be backed up. For example, backup client application 132 and/or an administrator console (not shown) presents a user interface with a visual display of some or all of the directories of files stored at the data server. An administrator can configure the backup by selecting one or more directories and/or one or more files shown in the visual display to indicate the source data (e.g., file(s) and/or directories at which data server(s)) that are to be included into the save set in a backup process. In various embodiments, backup client application 132 and/or an administrator console (not shown) also presents a selectable option in the user interface to allow for restarting an interrupted backup process from a point of failure (e.g., enabling a checkpoint restart backup process). Once a save set is selected, in some embodiments, backup client application 132 begins the backup process (e.g., in response to requests by a backup server) on the selected source data and in the configured manner of backup. In some embodiments, the backup process traverses filesystem 130 deterministically (e.g., the filesystem is traversed in the same manner each time). For example, during a backup process, the directory entries of the filesystem are cached in memory and sorted (e.g., alphabetically). In some embodiments, the sorted data of the filesystem are backed up depth first (e.g., the deepest files are backed up first and then the containing directories).

In some embodiments, during the backup process, backup client application 132 sends data to be backed up to a storage node while it sends the index record and/or directory information of the data to a backup server. To maintain consistency of the data that is successfully written to backup media at the storage node and the records stored at the backup server (e.g., at the index database), in some embodiments, backup client application 132 does not send index and/or directory record information to the backup server until it receives confirmation (e.g., from the storage node) that the data corresponding to the records have been successfully written to the backup media. In this way, it is ensured that records information tracked at the backup server corresponds to only successfully saved data at the backup media. In some embodiments, "successfully saved data" refers to data objects (e.g., files and/or directories) that are fully (as opposed to only partially) written to the backup media.

In some embodiments, a recovery (e.g., restoration of backed up data to the data server) is initiated at the data server. In some embodiments, initiating a recovery process includes using recovery application 134 and/or an administrator console (not shown) to select backed up data to restore. For example, recovery application 134 and/or an administrator console (not shown can present a user interface (e.g., to an administrator) to select one or more save sets to recover. Or the user interface can present a browseable hierarchical data structure showing data objects of the filesystem that were successfully backed up and one or more individual data objects can be selected to be recovered.

Figure 2A:
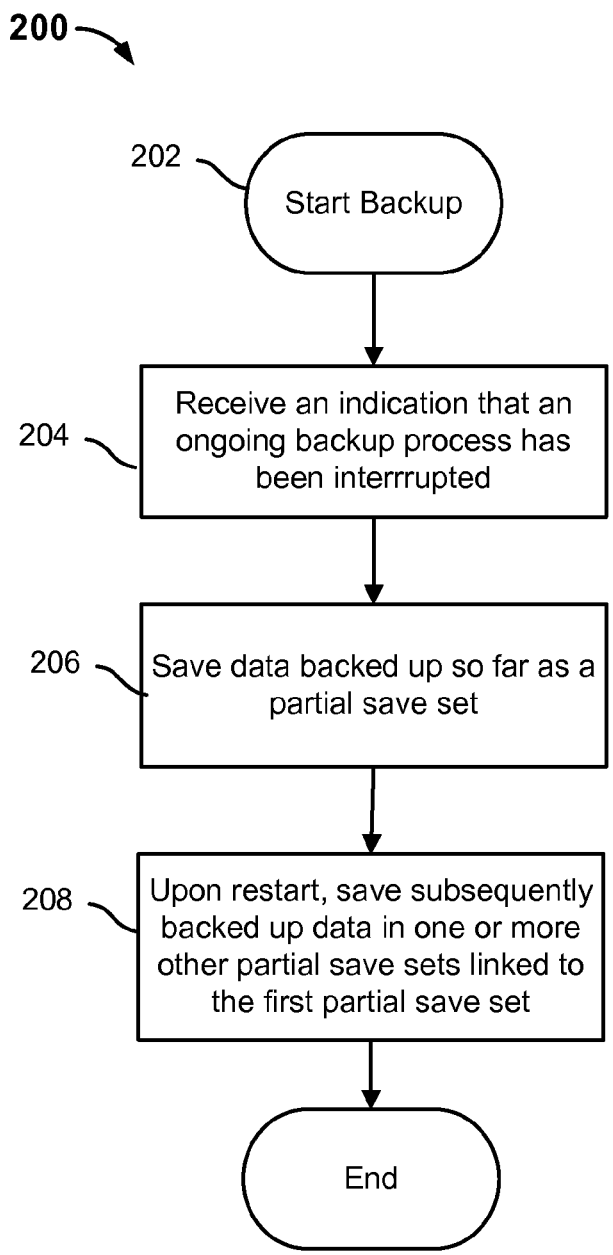
FIG. 2A is a flow diagram showing an embodiment of a backup process that is capable of restarting from a point of failure.

FIG. 2A is a flow diagram showing an embodiment of a backup process that is capable of restarting from a point of failure. In some embodiments, process 200 may be implemented with system 100. Process 200 can be applied for an incremental or full backup.

In some embodiments, an administrator of the backup system enables the capability to restart an interrupted backup process prior to the start of backup process through a user interface. For example, an administrator can select to enable checkpoint restart for a data server prior to the initiation of a backup process. In some embodiments, a checkpoint can be selected to be at the granularity or a file or a directory. For example, the granularity of checkpoint allows an administrator to fine-tune the backup to the particular type of backup data. For filesystems with many small files, a granularity of directory can be desirable. For filesystems with a few large files, a granularity of file can be desirable.

In various embodiments, at the start of process 200, a save set has already been selected at the data server for which the process is to be performed. The save set contains one or more files/directories (e.g., source data) at the data server to be backed up.

In some embodiments, process 200 illustrates that when a backup process is interrupted, rather than aborting the backup and starting over from the beginning, the data backed up prior to the interruption is saved as a partial save a set. Then, the backup process is restarted from where the interruption occurred (e.g., point of failure) at the filesystem. The data backed up subsequent to an interruption is saved as one or more partial save sets that are then linked to the first partial save set in the sequence.

At 204, an indication that an ongoing backup process has been interrupted is received. Examples of an interruption include, but are not limited to, a reboot, a network failure, and a crash at the data server. Another example of an interruption may include an intentional abort of the backup by an administrator who wishes to restart the backup at a later time in order to accomplish one or more of the following: to rebalance the load on the storage nodes (e.g., by later restarting the backup on a different storage node), to allow for a recover operation, or to allow for maintenance on the backup server or the data server. Regardless of the specific cause for the failure at the data server, the effect is a loss of communication between the data server and the backup server. In some embodiments, a backup server determines a failure at the data server through a ping call (e.g., that detects that the backup client application has abruptly disconnected from the backup server and/or storage node). In some embodiments, the backup client application or other logic at the data server detects that an interruption has occurred and then notifies either or both of backup server and storage node of the failure (e.g., when the data server is up again). In some embodiments, the data backed up so far is stored as a partial save set that is created by the backup server and the storage node.

At 206, the data backed up so far is saved as a partial save set. In various embodiments, because the checkpoint capability is enabled, after receiving an indication of an interruption to the backup process at 204, the data that is backed up until the interruption is saved as a partial save set. In various embodiments, during the backup process, once it is detected that an entire file has been successfully written to backup media, an entry is stored for the file at the index database. As such, an entry for a file at the index database indicates that the file has been fully written to the backup media. Similarly, when a file is only partially written to the backup media, an entry is not stored for the partial file at the index database. One or more index records including the successfully saved files in the partial save set, among other information related to the partial save set, are stored (e.g., at the index database) for the partial save set. In various embodiments, after all the files in a directory are saved, the list of entries contained in that directory (e.g., in the form a linked list data structure) is stored as a directory record (e.g., at the index database). In various embodiments, validity information (e.g., regarding the valid number of files and the valid size of data) is saved for the partial save set (e.g., at the media database). In various embodiments, attributes are stored for the partial save set at the media database that identify to which save set it belongs and where it is in the sequence of partial save sets for that save set. For example, if the partial save set created in 206 is the first in the sequence of two or more partial save sets that cover the original save set, it will be assigned a sequence identifier that denotes its first position in the sequence.

At 208, upon restart, the subsequently backed up data is saved in one or more partial save sets linked to the first partial save set. In some embodiments, the backup is restarted by the backup client application data server. In some embodiments, the restart is manually initiated by an administrator. In some embodiments, the restart is automatically restarted by the backup server (e.g., if the backup client application is configured for automatic restart). The backup process is restarted from the point of a failure (e.g., the interruption detected at 204, as opposed to re-running the entire backup process from the beginning. In various embodiments, the backup process resumes from the last successfully saved file (e.g., checkpoint) of the previous partial save set. The last successfully saved file may be determined using the metadata (e.g., stored at the index database) for the previous partial save set (e.g., the partial save set created after the interruption was detected). In some embodiments, the backup process restarts in the filesystem from the closest point after the determined last successfully saved file. For example, the backup client application can query for the attribute information associated with the save set at the media database and validate that it can be restarted (e.g., attribute information of the save set exists and/or a full sequence of partial save sets exist). Then, for this save set (e.g., as identified by the save time of the first partial save set), the backup client application can determine the next file after the last successfully saved file in the filesystem to backup after the restart.

In various embodiments, unless the backup process is started from the beginning, the data saved after restart is considered to be a part of a new partial save set. In various embodiments, the new partial save set does not contain files that have been successfully saved in the previous partial save set because the new partial save set restarts the backup process at files found after the determined checkpointed file. Because the filesystem is sorted for deterministic traversal, files before a checkpoint are considered to have been successfully backed up and files after a checkpoint are considered to not have been successfully backed up. This is true even if a file after the checkpoint was partially backed up before the last interruption because the index record only tracks entire files that were written to the backup media.

In various embodiments, the filesystem is "live" during a backup process. A live filesystem refers to the notion that files can be operated upon (e.g., added, removed, or modified . . . etc) while the backup process is still ongoing. However, in various embodiments, any changes to a previous partial save set (e.g., during the period of interruption) are not part of the subsequent partial save set. Put another way, a subsequent partial save set does not capture modifications to files that were considered to be successfully saved as part of the previous save set. Also, in various embodiments, a previous save set is not reopened up and appended to by a subsequent partial save set.

In various embodiments, a subsequent partial save set is linked to one or more partial save sets in the sequence. In some embodiments, a subsequent partial save set is linked to another partial save set in the sense that their associated attribute information identifies the partial save sets to be in the same sequence and where in the sequence each partial save set is. In some embodiments, the subsequent partial save set is linked to a previous partial save set and also to the first partial save set in the sequence. In some embodiments, linking a subsequent partial save set to a previous partial save set and the first partial save set includes storing attribute information (e.g., at the media database) for the subsequent partial save set that indicates that the two partial save sets are a) part of the same sequence of partial save sets and b) the subsequent partial save set follows the previous partial save set in the same sequence.

Figure 2B:
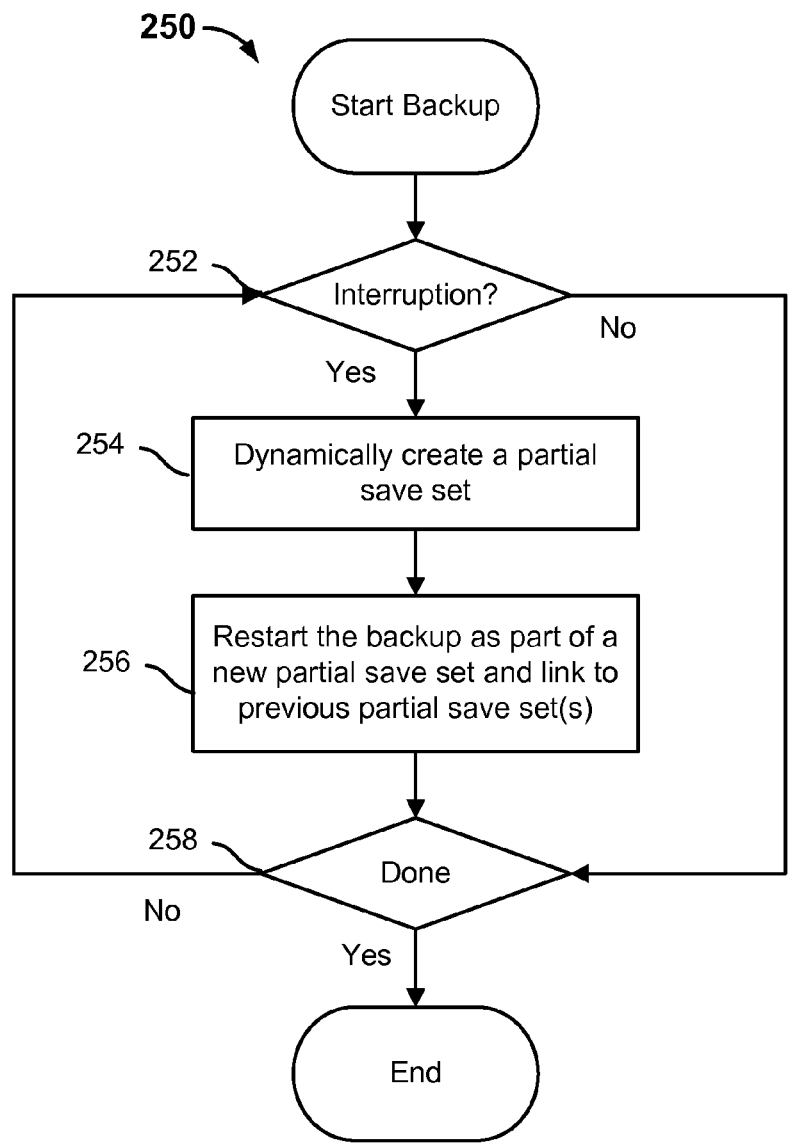
FIG. 2B is a flow diagram showing another embodiment of a backup process that is capable of restarting from a point of failure.

FIG. 2B is a flow diagram showing another embodiment of a backup process that is capable of restarting from a point of failure. In some embodiments, process 250 illustrates the details of process 200 upon each interruption during a backup process that is capable of restarting from a point of failure.

In some embodiments, process 250 illustrates that each time an interruption occurs in a backup process of a save set, a partial save set is created and linked to a previous save set (if one has already been created), until the process completes backing up all the contents included in the save set.

At 252, it is determined whether an interruption has occurred in the backup process. If an interruption at the data server is not detected at 252, then the backup proceeds until it is completed for the entire save set and the process ends. If an interruption at the data server is detected at 252, then control passes to 254.

At 254, a partial save is dynamically created. In some embodiments, creating a partial save set includes storing the index records, directory records, validity information for the data backed up prior to the interruption detected at 252. In some embodiment, index records, directory records and validity information are stored with the attribute information that identifies the particular partial save set. As mentioned above, an index record includes only data that has been successfully written to backup media (e.g., entire files that were written to the backup media). A directory record includes a data structure representing a directory of the filesystem for which all the containing entries have been successfully written to the backup media. In some embodiments, creating a partial save set also includes storing attributes to link the partial save set to previously created partial save sets, if any, for the same sequence.

At 256, the backup process is restarted as part of a new partial save set and linked to previous partial save set(s). In some embodiments, the backup process is restarted from a point in the filesystem following the last successfully backed up file (e.g., checkpoint) by the previous partial save set. In some embodiments, metadata such as index records and/or directory records stored for the previous partial save set is retrieved (e.g., from the index database) to determine the last file of the filesystem that was successfully backed up. By determining the last successfully saved file, the backup process may restart with the next closest point in the sorted filesystem. Data backed up subsequent to a restart is considered to be a part of a new partial save set. In various embodiments, the previous partial save set is not reopened and appended to. The previous partial save set is also not modified by a subsequent partial save set. In various embodiments, the newly created partial save set is linked to one or more previously created partial save sets of the same sequence. The newly partial save set may be linked to previous partial save sets through storing attribute information for the partial save set (e.g., at the media database) that identifies the sequence (e.g., by the save time of the first partial save set of the sequence) and its position in the sequence (e.g., by an identifier associated with its position in the sequence).

At 258, it is determined whether the backup process has completed. In various embodiments, a completed backup process refers to a backup process that has finished backing up all the contents of a save set. If the backup process is not complete, then control passes to 252. If the backup process is complete, then the most recently created partial save set is the last partial save set of the sequence and process 250 ends. In various embodiments, when the last partial save set in a sequence is completed without interruption, then a complete sequence of partial save sets exists for the save set. In various embodiments, when there is a complete sequence of partial save sets, the individual files of the save set are browseable during a recovery process.

Figure 3:
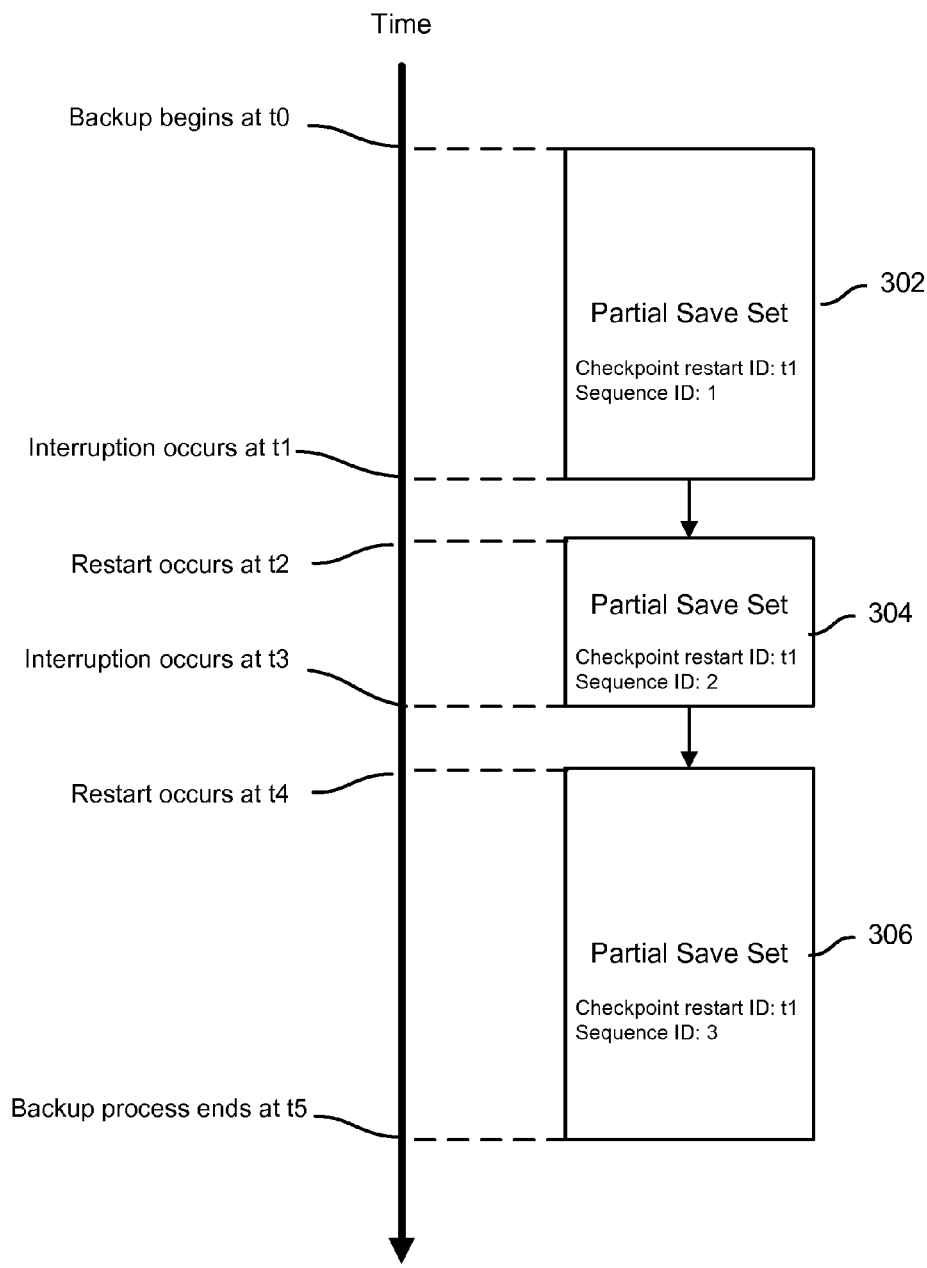
FIG. 3 is a diagram showing an example of partial save sets created in a process of restarting an interrupted backup process from a point of failure.

FIG. 3 is a diagram showing an example of partial save sets created in a process of restarting an interrupted backup process from a point of failure. In some embodiments, the example shown in FIG. 3 is the result of process 250. In the example, t1 occurs later in time than t0, t2 occurs later than t1, and t3 occurs later than t2 . . . etc.

To summarize the example of FIG. 3, two interruptions occur during an iteration of process 250 (e.g., between the beginning of a backup of a save set and the end of the backup). Each of partial save sets 302, 304, and 306 represents the metadata saved for the data that was successfully backed up in between the times denoted for the partial save set (e.g., t0 and t1 for partial save set 302). Partial save set 302 was created after the first interruption (beginning at t1), partial save set 304 was created after the restart (beginning at t2) and partial save set 306 was created at the completion of the backup process. Partial save sets 302, 304, and 306 are linked together through the attributes of "Checkpoint restart ID," which indicates the save or creation time of the first partial set (partial save set 302) of the sequence, and "Sequence ID," which indicates the position in the sequence of each partial save set. Partial save sets 302, 304, and 306 form a complete sequence of partial save sets covering the original save set. Partial save sets 302, 304, and 306 may be accessed to recover files of the original save set.

A detailed walk-through of the example of FIG. 3 is as follows:

A backup process for a save set begins at time t0. At time t1, an interruption is detected at the data server (e.g., 252 of process 250). The first partial save set (e.g., 302) is created (e.g., 254). In some embodiments, creating a partial save set includes saving metadata related to the partial save set at an index database and a media database. Examples of metadata include, but are not limited to, one or more index records of the files that were successfully saved, structures of directories that were successfully saved, valid file count and valid data size for each partial save set. In this example, attribute information include a value of "t1" for "checkpoint ID" and a value of "1" for "sequence ID," which are stored for partial save set 302 (e.g., at the media database). In this example, the "checkpoint ID" (e.g., the creation time of the first partial save set) is the same for all the partial save sets in a sequence and the "sequence ID" (e.g., the position in the sequence of the partial save set) is a value that is incremented for each subsequent partial save set. Because partial save set 302 is the first partial save set in the sequence, its "sequence ID" is "1."

At time t2, the backup process is restarted (e.g., 256). At t3, an interruption is detected at the data server (e.g., 252). The second partial save set (e.g., 304) is created (e.g., 254). Attribute information including a value of "t1" for "checkpoint ID" and a value of "2" for "sequence ID" are stored for partial save set 304 (because 304 is the second partial save set in the sequence).

At time t4, the backup process is restarted (e.g., 256). At t5, the backup process completes for the original save set. The third and last partial save set (e.g., 306) is created. Attribute information including a value of "t1" for "checkpoint ID" and a value of "3" for "sequence ID" are stored for partial save set 304 (because 306 is the third partial save set in the sequence).

In some embodiments, a sequence of partial saves sets (e.g., 302, 304, and 306) is not the same as a backup that completes without any interruptions. As mentioned before, in a live filesystem, files may be modified over time. If the period between an interruption and restart of the backup is long (e.g., as defined by an administrator for a manual restart), then a sequence of partial save sets may collectively provide an image of the filesystem that is different than the state of the filesystem at any given time.

In some embodiments, a partial save set is available for cloning and scanning. In some embodiments, an administrator can determine whether a sequence of partial save sets covers the original save set (e.g., by querying the media database).

Figure 4:
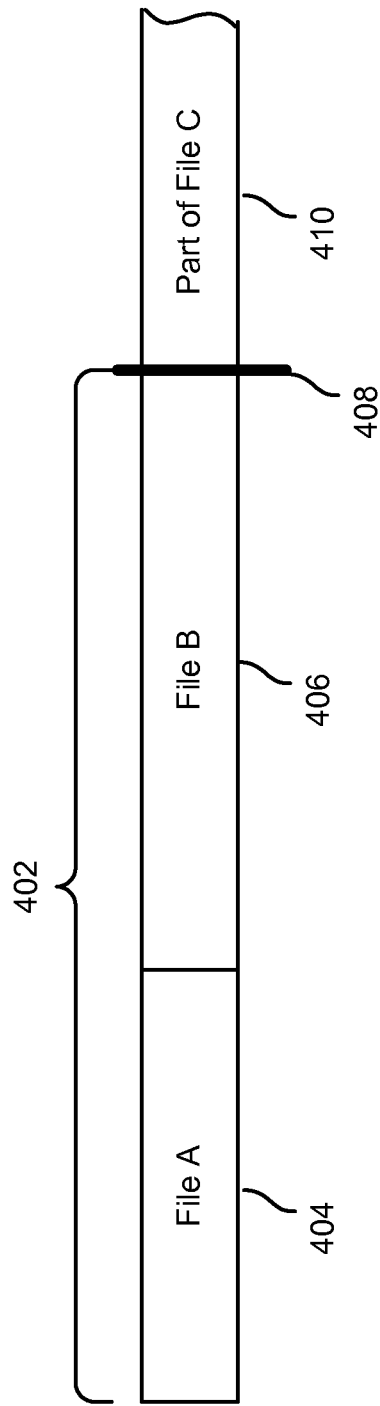
FIG. 4 is a diagram showing an example of including successfully saved files in a partial save set.

FIG. 4 is a diagram showing an example of including successfully saved files in a partial save set. As mentioned above, in various embodiments, the metadata for a partial save set includes only the files that were successfully saved at the backup media (e.g., files that were saved in their entirety as opposed to saved only in part). One advantage to keeping track of files that are fully saved is that when recovery is later performed, only complete (e.g., valid) files are read from the backup media.

As shown in the example of FIG. 4, File A 404, File B 406 and Part of File C 410 represent data that are written to backup media during a backup process before an interruption occurs at the data server. Among the three files, only File A 404 and File B 406 are complete files that are written to the backup media. The backup process was interrupted in the middle of writing File C to the backup media so only Part of File C 410 is written to the media. Since File A 404 and File B 406 are complete files, corresponding metadata are stored for those files for the partial save set of which they are included. However, corresponding metadata is not stored for File C because only Part of File C 410 has been written to the backup media. For example, when a partial save set including data 402 (e.g., data including at least File A 404 and File B 406) is a created, the index record corresponding for the partial save set (e.g., at the index database) will include an entry for File A 404 and an entry for File B 406 but no entry for File C. Also, validity information created for the partial save set (e.g., at the media database) will include both File A 404 and File B 406 (but not File C) as part of the valid file count and the valid data size for that partial save set. If/when a recovery is performed for the partial save set, then such metadata may be retrieved (e.g., from the media database) so that data 402 may be recovered up until point 408 in the backup media. Put another way, in a recovery of the partial save set, stored metadata is used to read and recover only the complete files (e.g., File A 404 and File B 406) and not any partial files (e.g., Part of File C).

In some embodiments, an entry for a file is stored in the index database only subsequent to receiving confirmation that the file has been completely written to the backup media. For example, the backup client application at a data server can coordinate the storing of information at an index database. In this example, the backup client application includes two buffers (e.g., in memory). The first buffer includes data to be sent to the storage node and a second buffer includes the index record (corresponding to the data of the first buffer) to be sent to the index database. The first buffer for holding data can hold data from different files. The second buffer for holding index records can accumulate many index records, depending on the size of each record (e.g., which varies based on file names and other file attributes). In some embodiments, once a buffer is full, the buffer will be sent to the backup server (e.g., if it is the index buffer) or storage node (e.g., if it is the data buffer). Sometimes, even if all the data associated with a file is on the first data buffer but the buffer is not full, the first data buffer will not be sent to and flushed at the storage node. At the same time, the index record associated with the file may fill up the second index buffer in its entirety and so the second index buffer will be sent to and flushed at the index database. However, flushing an index record associated with a file that has not yet been written to backup media (e.g., data associated with the file has not yet been flushed from the first data buffer) may result in an entry at the index database that relates to a file that has not been completely written to backup media. To prevent this scenario, the space left in the index buffer is calculated and if it is determined that the file's index record will cause the index record to be flushed, then the data buffer is triggered to be flushed at the storage node first. In some embodiments, the backup client application waits to receive confirmation from the storage node that the data flushed from the data buffer has been successfully written to backup media before permitting the index buffer to be flushed. Upon receiving confirmation that the data has been successfully written to backup media, the index buffer is flushed at the index database. By writing index records subsequent to receiving confirmation of data written to backup media, it is ensured that an entry for data at the index database indicates that the data can be fully found on the backup media.

Figure 5:
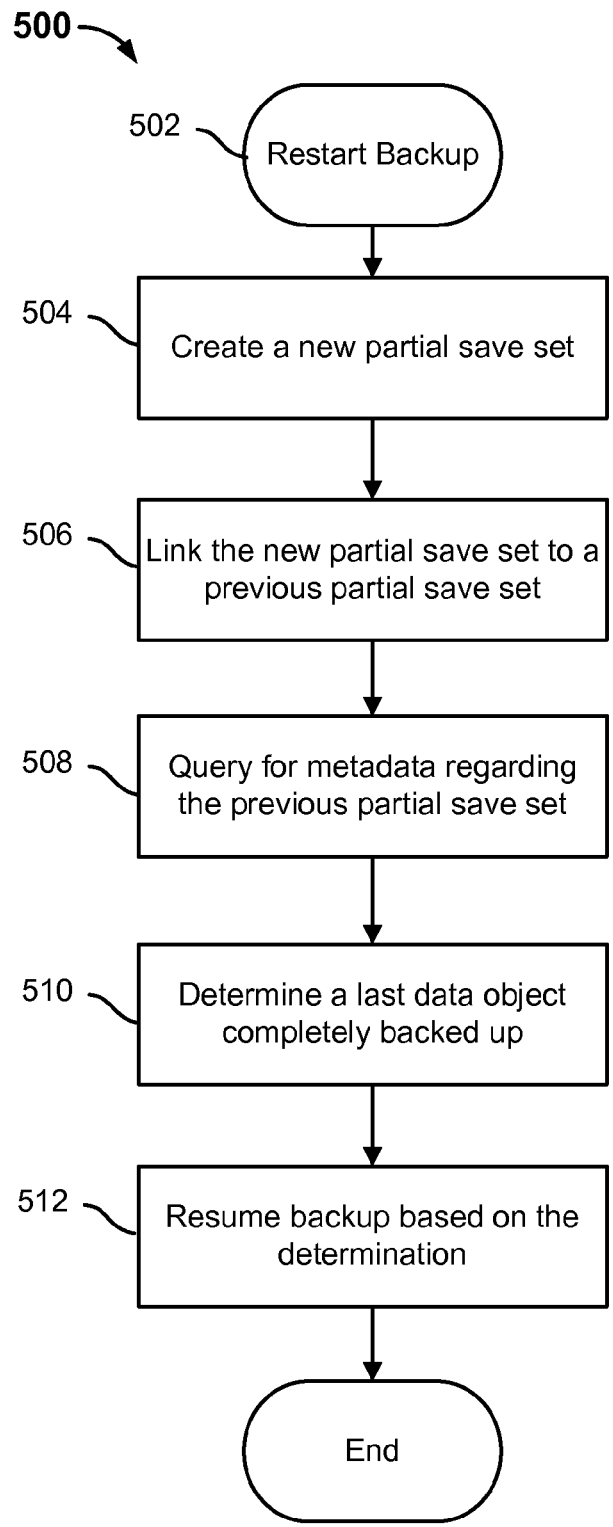
FIG. 5 is a flow diagram showing an example of restarting an interrupted backup process from a point of failure.

FIG. 5 is a flow diagram showing an example of restarting an interrupted backup process from a point of failure. In some embodiments, 254 and 256 of process 250 can be implemented with process 500.

Since the backup process of this example is restarted at 502, a previous partial save set is assumed to have been created for the data that was successfully backed up before the backup was interrupted.

At 502, the backup process of a save set is restarted after an interruption. In some embodiments, the interruption occurred at the data server from which the backup process was initiated. In some embodiments, the restart is manually initiated by an administrator. In some embodiments, the restart occurs automatically after the communication is established between the data server and the backup server. For example, after an interruption is detected, the backup client application at the data server can reestablish a connection with the backup server and send an indication to restart the backup.

At 504, a new partial save set is created. In some embodiments, creating a partial save set includes creating and storing metadata related to the partial save set. Examples the metadata include, but are not limited to, one or more index records (e.g., mapping the files that are successfully saved for the partial save set to their respective locations in storage), directory structures (e.g., for the saved files) and validity information (e.g., the valid file count and the valid data size of the partial save set). In various embodiments, the entries for the files that were successfully saved prior to the interruption are included in one or more index/directory records stored for the created partial save set (e.g., at the index database). The index/directory records may also include identifying information that they are associated with a "partial" save set (as opposed to a complete save set). In some embodiments, for a directory for which all of the files were successfully saved, a data structure (e.g., directory record) representing the structure of the directory is stored (e.g., at the index database). In various embodiments, the total number of files that are included in the partial save set is stored as the valid file count and the total size of all the valid files is also stored for the partial save set (e.g., at the media database).

In some embodiments, the metadata is updated as the backup progresses (e.g., the metadata is updated as more files and directories are successfully saved for a partial save set).

At 506, the new partial save set is linked to a previous partial save set. In some embodiments, linking a subsequent partial save set to a previous save set includes storing attribute information (e.g., at the media database) for the subsequent partial save set. For example, stored attribute information for the new partial save set includes an identifier of the sequence of partial save sets of which it is a part and an identifier denoting its position in the sequence. The new partial save set can be linked to the previous partial save set by taking the same sequence identifier (e.g., the save time of the first partial save set in the sequence) as the previous partial save set. Also, the new partial save set can take a sequence identifier that is the next integer greater than the sequence identifier of the previous partial save set.

In some embodiments, 504 and 506 are performed at either the next interruption or at the completion of the backup process.

At 508, the metadata corresponding to the previous partial save set is queried. In various embodiments, the index database and/or media database is queried. In some embodiments, the backup client application at the data server queries the media database for the sequence of partial save sets. In some embodiments, the media database returns information on the sequence of partial save sets. Based on the returned information, the backup client application determines the last partial save set and queries the index database for metadata for that partial save set. In some embodiments, the index database returns metadata (e.g., an index record or a portion of the index record) corresponding to that partial save set.

At 510, last data object completely backed up is determined. The returned metadata can be used to determine the last data object (e.g., file or directory) completed backed (e.g., checkpoint) in the filesystem from which the backup process is to resume. In various embodiments, the returned index record or a portion thereof is used to determine the last data object that was successfully written to backup media.

At 512, the backup is resumed based on the determination. In various embodiments, the filesystem is sorted (e.g., the directory entries are cached and sorted alphabetically prior to processing) so that it may be traversed in the same order every time. In some embodiments, the backup process is resumed from the next closest file subsequent to the checkpointed file of the filesystem. As mentioned before, because the entries of the filesystem are traversed in the same order each time, data objects before the checkpoint are considered to have been successfully backed up while data objects after the checkpoint are considered to not have been backed up (or successfully so).

In various embodiments, a directory record to be stored at the index database is reconstructed upon restart because a modification (e.g., addition or removal of a file or sub-directory) has occurred at the "live" filesystem during an interruption of the backup process. In some embodiments, after each file in a directory is successfully backed up on the media, it is stored in memory as a directory entry in a data structure (e.g., linked list) of directory entries. After all the files in a directory are saved, the linked list of directory entries is saved as part of the directory record (e.g., stored at the index database). When a backup process is interrupted in the middle of saving a directory, there is a chance that the contents of the directory will change before the backup process is restarted. In some embodiments, to generate a linked list of files in a directory containing the last successfully backed up file (e.g., checkpoint), the directory entries for files saved in the previous save sets are merged with the files saved in the current partial save set. Put another way, when a backup process is interrupted while saving a directory, upon restart, the directory record for the directory will include entries for files that were previously saved and also for ones that are saved after restart (e.g., in the current partial save set). In some embodiments, as a result of reconstructing a directory in this manner, the directory record can include entries of files or sub-directories that never co-existed at a given time. However, such reconstruction of a directory is useful in creating a complete linked list of entries in the directory so that the files that are backed up for the directory (e.g., in more than one partial save set) can be browsed during recovery. FIG. 6A, FIG. 6B, FIG. 6C and FIG. 6D are examples to help illustrate this concept of directory reconstruction.

Figure 6A:
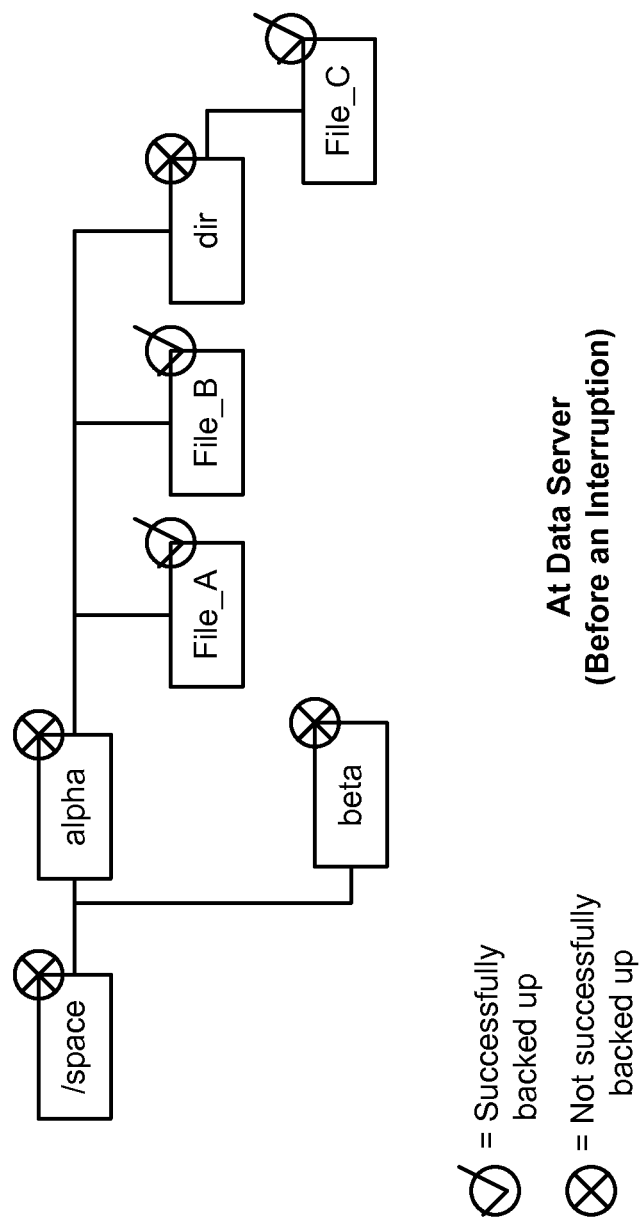
FIG. 6A is a diagram showing an example of files in a directory of a filesystem at a data server before an interruption of the backup process occurs.

FIG. 6A is a diagram showing an example of files in a directory of a filesystem at a data server before an interruption of the backup process occurs.

In various embodiments, the entries of a directory at the filesystem are sorted (e.g., alphabetically) and traversed in a depth first fashion during a backup process. For the directory (/space) that is being backed up in the example of FIG. 6A, the files and sub-directories that are successfully backed up in a partial save set before an interruption are shown with checks while those that are not successfully backed up are shown with crosses.

Figure 6B:
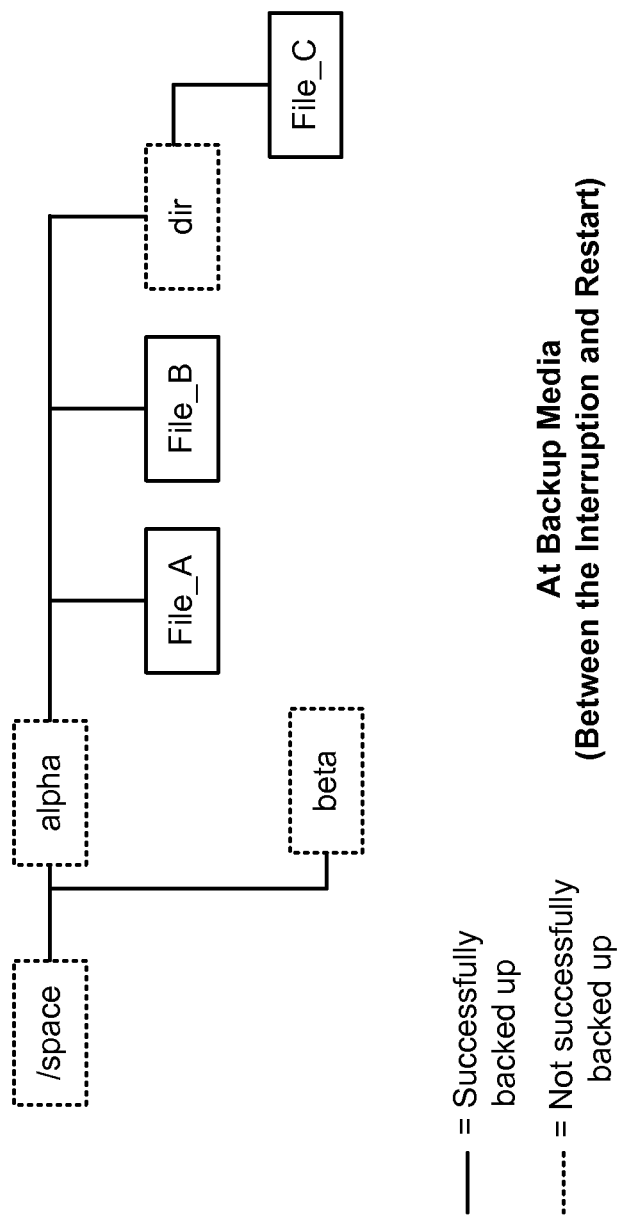
FIG. 6B is a diagram showing an example of the files of FIG. 6A saved at the backup media between the interruption and restart.

FIG. 6B is a diagram showing an example of the files of FIG. 6A saved at the backup media between the interruption and restart.

The files shown in the example of FIG. 6B with solid lines have been successfully saved and included in a partial save set. The files and sub-directories shown in dotted lines have not been successfully saved. Index entries of the successfully saved files are stored as index records at the index database.

To summarize, the following files are successfully backed up on the backup media in a partial save set before the interruption occurred at the data server:

/space/alpha/File_A
/space/alpha/File_B
/space/alpha/dir/File_C

In some embodiments, a data structure of a directory's entries is stored as a directory record (e.g., at the index database) only after all the files of the directory have been successfully saved. In this example, because not all the files of directory /space have been backed up at this point, a directory record for /space is not yet stored. However, entries for the files are stored within one or more index records (e.g., denoting with which directory the files is associated and where the files are in storage node, etc) for the partial save set.

Figure 6C:
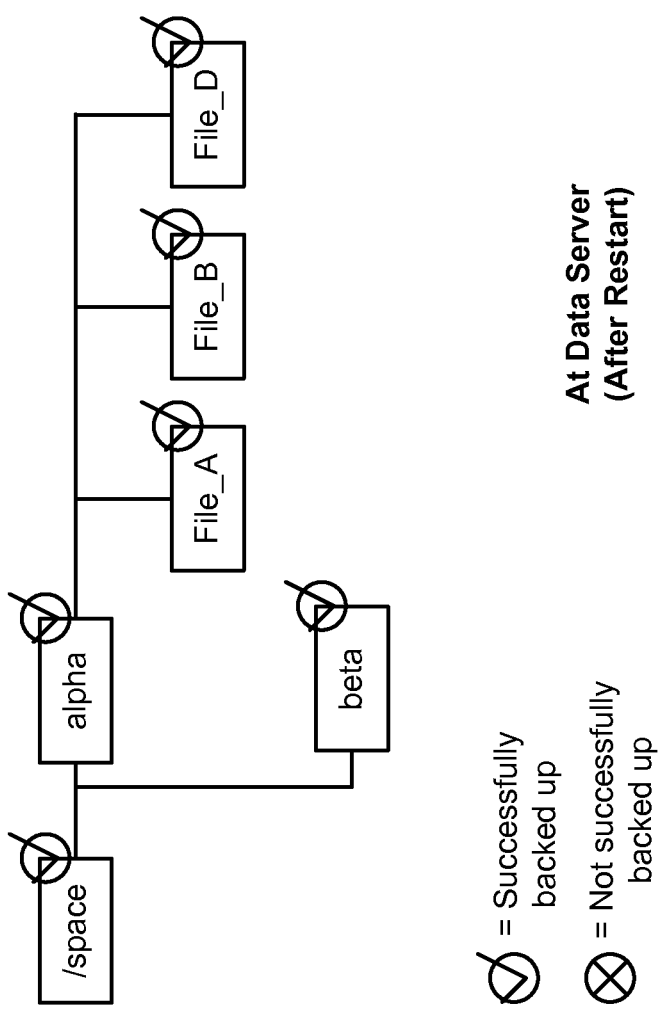
FIG. 6C is a diagram showing an example of files in the directory of FIG. 6A after a restart of the backup process.

FIG. 6C is a diagram showing an example of files in the directory of FIG. 6A after a restart of the backup process.

During the period of interruption, the directory /space has been modified as shown in the example of FIG. 6C. Specifically, /space/alpha/dir/ and /space/alpha/dir/File_C have been removed and /space/alpha/File_D has been added. After restart, the current partial save set resumes backup of the files in /space that were not saved in the previous partial save set. Also after restart, the index record entries of the files that are already at the backup media (e.g., the files saved as shown in FIG. 6B) are retrieved to be included into the directory record for /space. In some embodiments, to determine which files of the directory were saved in the previous partial save set, the index database is queried.

Figure 6D:
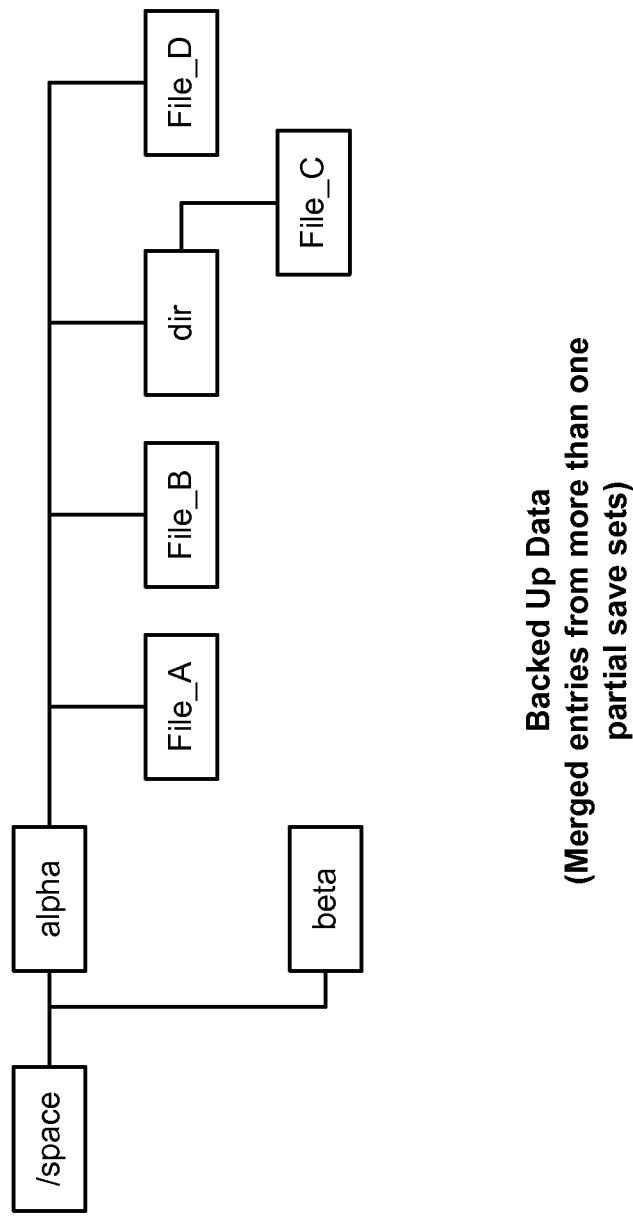
FIG. 6D is a diagram showing an example of the structure of the stored directory record for the directory backed up in FIG. 6A and FIG. 6C.

After all the files of /space are successfully backed up as shown in FIG. 6C, the directory record for /space is stored (e.g., at the index database). The stored directory record for /space includes entries of files that are saved in the current partial save set merged and linked with entries of files that were backed up in the previous partial save set (e.g., the files stored before the interruption). The stored directory record for /space is also reconstructed to include any sub-directories (e.g., dir) that are no longer part of /space after the restart. In addition to the entries of FIG. 6B, the following entries are included in the stored directory record for /space:

/space/alpha/dir (linked to File_C)
/space/alpha/File_D
/space/alpha (linked to File_A, File_B, and dir)
/space/beta FIG. 6D is a diagram showing an example of the structure of the stored directory record for the directory backed up in FIG. 6A and FIG. 6C. In some embodiments, a directory record is stored as a linked list of all the entries for the directory (e.g., at the index database).

The directory record for /space shows directory entries (e.g., dir, File_C and File_D) that did not co-exist at the filesystem at the same time. Specifically, File_C was saved but removed during the interruption, dir was not saved but removed during the interruption of the backup and File_D was added after the interruption and then saved. Nevertheless, the reconstruction of the directory record /space permits all the files for the directory that were backed up in multiple partial save sets to be browsed and selected to be restored in a recovery process.

In some embodiments, in a data object recovery process, the directory of /space is presented as the structure of FIG. 6D so that one or more of the files backed up for the directory may be browsed, selected and accessed for restore.

In some embodiments, there are two types of recovery of backed up data. In the first type, a save set is recovered as a sequence of partial save sets. In this type of recovery, each partial save set in the sequence for the save set is recovered, except for the files that were not entirely written to backup media. In the second type, an individual file or directory can be recovered (e.g., via a selection on a browseable hierarchical directory). In this type of recover, a user can browse the filesystem (e.g., all the data that was backed up) and select files and/or directories to recover. The recovery application can then contact the storage node to request particular sections of the save sets (because multiple save sets may be involved) to be sent back to the recovery application. Then, the recovery application can write the returned data as files, thereby restoring these files.

Figure 7:
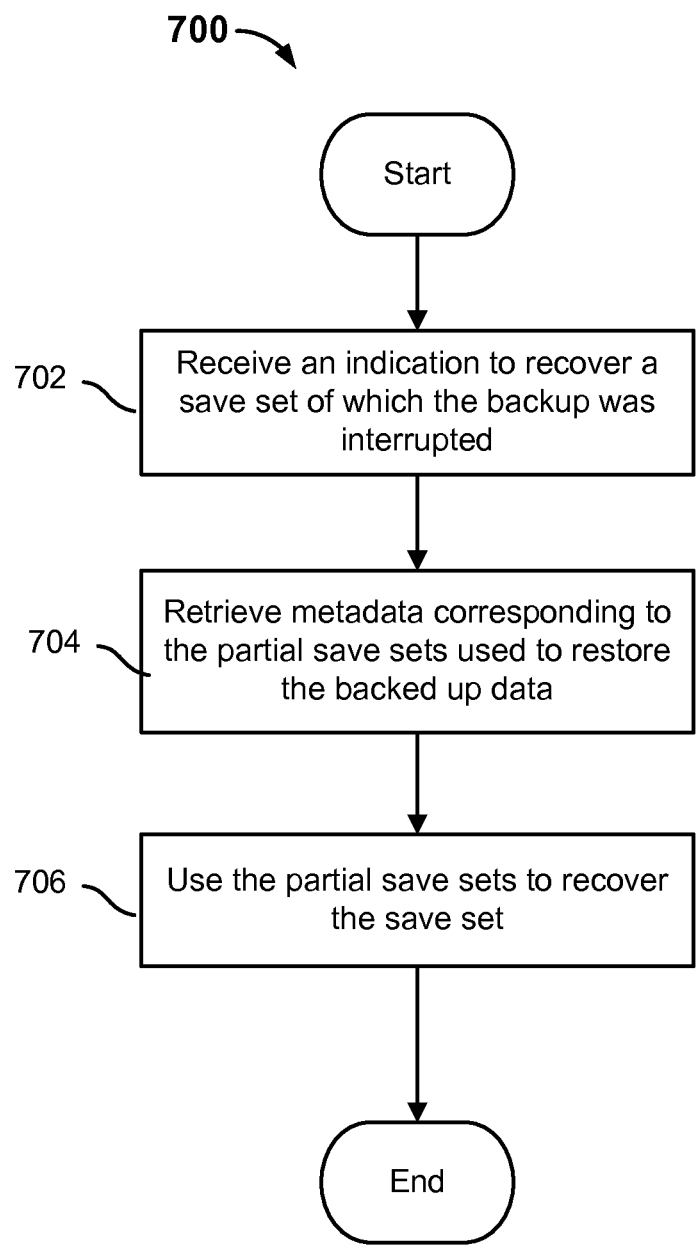
FIG. 7 is a flow diagram showing an embodiment of recovering a save set comprising a sequence of partial save sets.

FIG. 7 is a flow diagram showing an embodiment of recovering a save set comprising a sequence of partial save sets.

In some embodiments, a save set that was backed up with one or more interruptions to the backup process results in a sequence of partial save sets. In some embodiments, a save set is recovered using the sequence of partial save sets (e.g., all the files included in the sequence of partial save sets are copied back to a data server).

At 702, an indication to recover a save set of which the backup was interrupted. In some embodiments, a process to recover a save set is initiated at a data server. In some embodiments, one or more save sets are presented (e.g., at a user interface) by the recovery application at the data server. In some embodiments, the contents of a save set are also displayed at the user interface. In some embodiments, a presented save set is selected (e.g., by an administrator at the data server) to be recovered. In some embodiments, an indication of the selected save set is sent to the backup server. For example, the selected save set can be identified by its attribute information (e.g., save time of the first partial save set in the sequence). In some embodiments, the administrator can select a destination (e.g., at the data server) to which the files of the save set are to be recovered.

At 704, metadata corresponding to the partial save sets used to restore the backed up data is retrieved. In some embodiments, the metadata includes index records and validity information for the partial save sets in the sequence for the selected save set. The metadata for the partial save sets in the sequence of the selected save set can be identified by their attribute information. For example, the sequence of partial save sets associated with a save set is identified by an attribute of the save time of the first partial save set in the sequence. As such, the partial save sets stored with the same save time of the first partial save set can be identified as part of the same sequence. The identified partial save sets can also be sorted into their respective position in the sequence based on another stored attribute of sequence identifier. In some embodiments, once the partial save sets from a sequence are identified, the corresponding index records for each partial save set are retrieved (e.g., from the index database). Index records include, for example, which files are saved in which partial save sets and where on the storage they are located. In some embodiments, the validity information for the identified partial save sets are retrieved (e.g., from the media database). The validity information includes, for example, the valid file count and valid data size of all the files included in each partial save set of the sequence.

At 706, the partial save sets are used to recover the save set. For example, the index records associated with the selected sequence of partial save sets are referenced to locate the one or more locations in storage (e.g., on the backup media) of the files of the save set. Also, the validity information is referenced to determine the number of valid files of and the valid data size of all the files of each of the partial save sets. In various embodiments, when the metadata is used to access the backed up data of the partial save set, only the valid (e.g., completely saved files) are read from the backup media. Partial files saved on the backup media are not read because they are typically not recoverable (e.g., corrupted) and therefore not referenced by the metadata. In some embodiments, each partial save set in the sequence for a selected save set is recovered at a time. In some embodiments, multiple partial save sets of the sequence are recovered at a time.

Referring back to the example of FIG. 4, when data 402 of a partial save set is recovered from the storage, the recovery process reads File A 404 and File B 406, up until point 408 of the backup media when the last successfully saved file (File B) ends. The recovery process does not access Part of File C 410 because it is a partial file that cannot be recovered.

In some embodiments, the recovered files of the selected save set are saved back on the data server at the selected destination location(s).

In some embodiments, a save set recovered from a sequence of partial saves sets is not the same as a backup that completes without any interruptions. This is because in a live filesystem, files may be modified over time. If the period between an interruption and restart of the backup is long, then a sequence of partial save sets may collectively provide an image of the filesystem that is different than the state of the filesystem at any given time.

Figure 8:
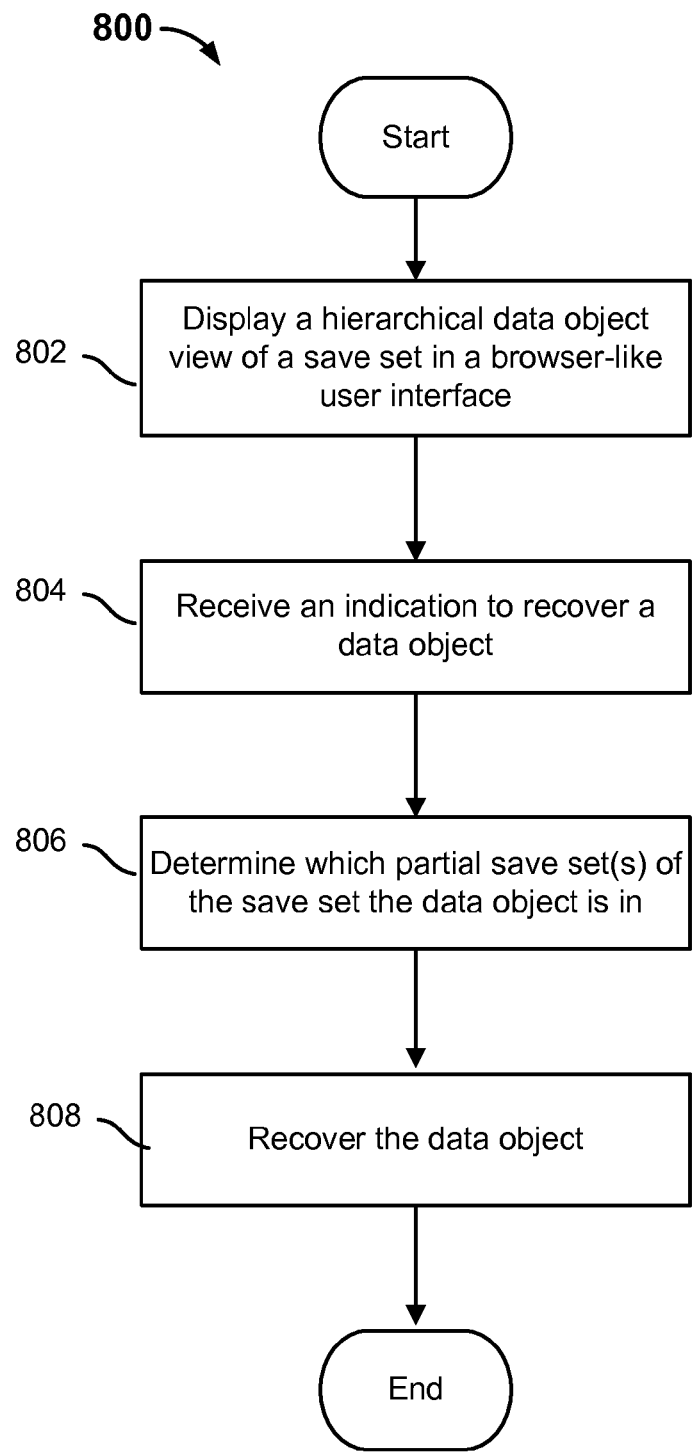
FIG. 8 is a flow diagram showing an embodiment of a recovering a data object.

FIG. 8 is a flow diagram showing an embodiment of a recovering a data object.

In some embodiments, data object recovery refers to recovering one specific data object at a time. Examples of data object include a file or a directory of files. In various embodiments, data object recovery is only available when a complete sequence of partial save sets exists to cover an original save set. A complete sequence of partial save sets exists when the last partial save set of the sequence finishes without interruption. One reason that a complete sequence is needed is because, in various embodiments, the backup process traverses the filesystem depth first, saving the root directory last (e.g., in the last partial save set of a complete sequence). However, in the data object recovery process, the backed up directories are browsed starting at the root directory. Therefore, when a complete sequence is not available for a save set, then the directory structure of the backed up data objects cannot be browsed and so a single data object, whether it is a file or a directory, cannot be selected for recovery because the root directory has not been saved.

At 802, a hierarchical data object view of a save set is displayed in a browser-like user interface. In various embodiments, a save set is selected for which the data object recovery is to be performed. In various embodiments, the files and directories of files of the selected save set are displayed in a browseable hierarchical structure. In various embodiments, the selected save set is associated with a complete sequence of partial save sets. In some embodiments, whether a complete sequence of partial save sets exists for a save set can be determined by querying the associated media database. In some embodiments, the index database is queried for the one or more directory records associated with the selected save set. For example, the directory records (e.g., linked lists of directory entries) can be stored with attribute information identifying the sequence of partial save sets with which they are associated. In various embodiments, the backup client application at the data server displays a visual representation (e.g., FIG. 6D) of the directory structure of the save set at a user interface using the retrieved directory records.

At 804, an indication to recover a data object is received. In some embodiments, a file or directory of the displayed hierarchical structure is selected (e.g., a visual representation of a file or directory is clicked on at the user interface). In some embodiments, a destination location at the data server to which the file or directory is to be recovered is also selected and included in the indication. In some embodiments, a recovery application receives the selected data object.

At 806, which partial save set(s) of the save set the data object is in is determined. In some embodiments, the index database and the media database are both queried to determine metadata information associated with the selected data object. For example, the databases can be queried to determine which one or more of the partial save sets in the sequence for the save set includes data associated with the selected data object. Once the associated partial save set is determined, the index records for that partial save set can be retrieved (e.g., from the index database) to determine the location(s) in storage associated with the selected data object. For example, if the selected data object is a file, then the index and media database would be queried to determine the location(s) in storage of the single file. For example, if the selected data object is a directory, then the index and media databases would be queried to determine the locations in storage of the files contained in the directory. In some embodiments, the recovery application contacts either or both of the backup server (including the media and index databases) and storage node to request for the particular sections of saves sets that include the selected data object.

At 808, the data object is recovered. In some embodiments, the selected data object is accessed from the determined location in storage and copied to the data server. In some embodiments, the selected data object is recovered to the selected destination location at the data server. For example, if the selected data object is a file, then the single file would be recovered. For example, if the selected data object is a directory, then all the files contained in the directory would be recovered. In some embodiments, the recovery application uses the data that is returned by the storage node and/or backup server and writes it as the selected data object to be recovered.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for restarting backup, comprising:
receiving an indication of an interruption to a backup process, wherein the backup process is performed based at least in part on data objects associated with a save set;
saving data backed up prior to the interruption as a partial save set, wherein saving data backed up includes:
receiving one or more data objects to be written to backup media flushed from a first buffer maintained at a backup source;
determining that the one or more data objects to be written to the backup media associated with the first buffer have been fully written to the backup media;
sending an indication that the one or more data objects associated with the first buffer have been fully written to the backup media; and
receiving metadata corresponding to the one or more data objects flushed from a second buffer maintained at the backup source, wherein the metadata corresponding to the one or more data objects associated with the first buffer was flushed from the second buffer in response to the indication that the one or more data objects associated with the first buffer have been fully written to the backup media;
storing the metadata associated with the partial save set, wherein the metadata associated with the partial save set includes identifying information associated with the one or more data objects that were saved in the partial save set;
in response to receiving an indication to restart the backup process, determining the metadata associated with the partial save set;
restarting the backup process from a portion of the save set determined based at least in part on the metadata associated with the partial save set; and
saving subsequently backed up data in one or more subsequent partial save sets linked to a first partial save set.

2. The method of claim 1, wherein the interruption includes one of: a crash, a reboot, an abort of the backup process, or a network failure at a data server associated with the backup process.

3. The method of claim 1, wherein the save set comprises a set of source data to be backed up.

4. The method of claim 1, wherein the metadata associated with the partial save set includes mappings to one or more locations in storage for the one or more data objects identified in the partial save set.

5. The method of claim 1, wherein the metadata associated with the partial save set includes a valid data object count associated with a total number of the one or more data objects identified in the metadata associated with the partial save set.

6. The method of claim 1, wherein the metadata associated with the partial save set includes a valid data size associated with a total size of the one or more data objects identified in the metadata associated with the partial save set.

7. The method of claim 1, wherein one or more subsequent partial save sets and the first partial save set comprise a sequence of partial save sets.

8. The method of claim 1, wherein a subsequent partial save set linked to the first partial save set includes generating metadata associated with the subsequent partial save set identifying a save time associated with the first partial save set.

9. The method of claim 1, wherein a subsequent partial save set linked to the first partial save set includes generating metadata associated with the subsequent partial save set identifying that the subsequent partial save set succeeds the first partial save set in the backup process.

10. The method of claim 1, further comprising generating metadata associated with a subsequent partial save set including metadata associated with one or more data objects stored in a previous partial save set.

11. The method of claim 1, wherein the first buffer is triggered to be flushed based at least in part on a determination that storing metadata corresponding to a subsequent data object to the second buffer will cause the second buffer to be flushed.

12. The method of claim 1, further comprising sorting the data objects associated with the save set based at least in part on a first ordering prior to starting the backup process and further comprising sorting the data objects associated with the save set based at least in part on the first ordering prior to restarting the backup process.

13. A system of restarting backup, comprising:
a processor configured to:
receive an indication of an interruption to a backup process, wherein the backup process is performed based at least in part on data objects associated with a save set;
save data backed up prior to the interruption as a partial save set, wherein saving data backed up includes:
receiving one or more data objects to be written to backup media flushed from a first buffer maintained at a backup source;
determining that the one or more data objects to be written to the backup media associated with the first buffer have been fully written to the backup media;
sending an indication that the one or more data objects associated with the first buffer have been fully written to the backup media; and
receiving metadata corresponding to the one or more data objects flushed from a second buffer maintained at the backup source, wherein the metadata corresponding to the one or more data objects associated with the first buffer was flushed from the second buffer in response to the indication that the one or more data objects associated with the first buffer have been fully written to the backup media;
store the metadata associated with the partial save set, wherein the metadata associated with the partial save set includes identifying information associated with the one or more data objects that were saved in the partial save set;
in response to receiving an indication to restart the backup process, determine the metadata associated with the partial save set;
restart the backup process from a portion of the save set determined based at least in part on the metadata associated with the partial save set; and
save subsequently backed up data in one or more subsequent partial save sets linked to a first partial save set; and
a memory coupled to the processor and configured to provide the processor with instructions.

14. The system of claim 13, wherein the interruption includes one of: a crash, a reboot, and abort of the backup process, or a network failure at a data server associated with the backup process.

15. The system of claim 13, wherein the metadata associated with the partial save set includes mappings to one or more locations in storage for one or more data objects identified in the partial save set.

16. The system of claim 13, wherein the first buffer is triggered to be flushed based at least in part on a determination that storing metadata corresponding to a subsequent data object to the second buffer will cause the second buffer to be flushed.

17. The system of claim 13, wherein the processor is further configured to sort the data objects associated with the save set based at least in part on a first ordering prior to starting the backup process and wherein the processor is further configured to sort the data objects associated with the save set based at least in part on the first ordering prior to restarting the backup process.

18. A computer program product for restarting backup, the computer program product being embodied in a non-transitory computer readable storage medium and comprising computer instructions for:
receiving an indication of an interruption to a backup process, wherein the backup process is performed based at least in part on data objects associated with a save set;
saving data backed up prior to the interruption as a partial save set, wherein saving data backed up includes:
receiving one or more data objects to be written to backup media flushed from a first buffer maintained at a backup source;
determining that the one or more data objects to be written to the backup media associated with the first buffer have been fully written to the backup media;
sending an indication that the one or more data objects associated with the first buffer have been fully written to the backup media; and
receiving metadata corresponding to the one or more data objects flushed from a second buffer maintained at the backup source, wherein the metadata corresponding to the one or more data objects associated with the first buffer was flushed from the second buffer in response to the indication that the one or more data objects associated with the first buffer have been fully written to the backup media;
storing the metadata associated with the partial save set, wherein the metadata associated with the partial save set includes identifying information associated with one or more data objects that were saved in the partial save set;
in response to receiving an indication to restart the backup process, determining the metadata associated with the partial save set;
restarting the backup process from a portion of the save set determined based at least in part on the metadata associated with the partial save set; and
saving subsequently backed up data in one or more subsequent partial save sets linked to a first partial save set.

19. The computer program product of claim 18, wherein the first buffer is triggered to be flushed based at least in part on a determination that storing metadata corresponding to a subsequent data object to the second buffer will cause the second buffer to be flushed.

20. The computer program product of claim 18, further comprising sorting the data objects associated with the save set based at least in part on a first ordering prior to starting the backup process and further comprising sorting the data objects associated with the save set based at least in part on the first ordering prior to restarting the backup process.

* * * * *